May 24, 1938.  C. K. LAWRENCE ET AL  2,118,438
GRANULATION OF FERTILIZERS
Filed June 5, 1934
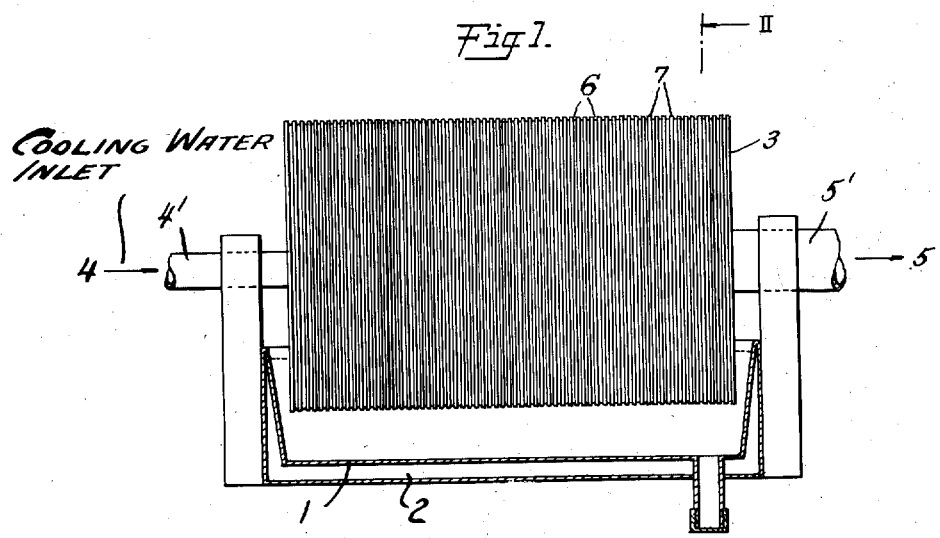
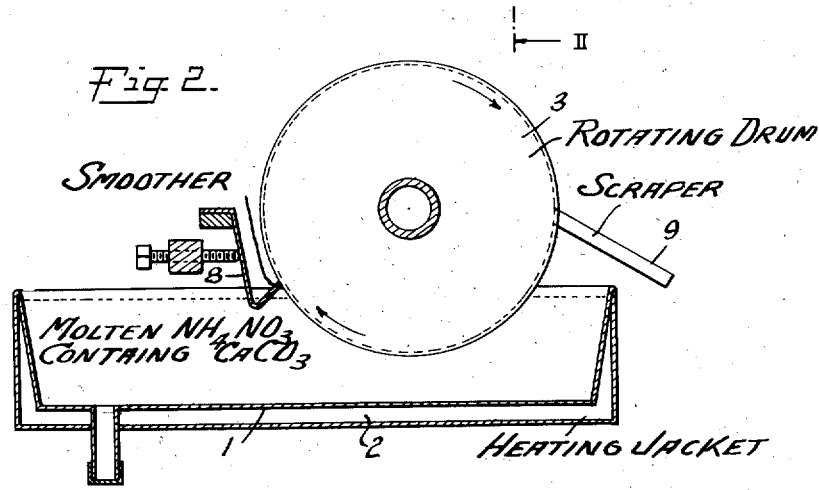
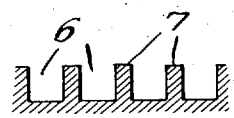
INVENTORS
Charles K. Lawrence
Aylmer H. Maude
BY
ATTORNEY Patented May 24, 1938

2,118,438

UNITED STATES PATENT OFFICE 2,118,438

GRANULATION OF FERTILIZERS

Charles K. Lawrence, Baldwinsville, N. Y., and Aylmer H. Maude, Prince George County, Va., assignors, by mesne assignments, to The Solvay Process Company, New York, N. Y., a corporation of New York Application June 5, 1934, Serial No. 729,066

5 Claims. (Cl. 71—60)

This invention relates to a process for the preparation of granular non-caking fertilizers, particularly from materials such as ammonium nitrate or urea and a finely divided inert solid material.

Numerous processes have heretofore been proposed for preparing fertilizers in granular form from melts or from solid crystalline substances such as ammonium nitrate and urea. For example, it has been proposed to granulate ammonium nitrate by heating moist crystals of the ammonium nitrate, with or without adding materials. The disadvantage of such a process is that the resulting product is not uniformly granular; that is, it contains relatively large proportions of fine particles and the granular particles themselves are not uniform in size. The granules themselves are not sufficiently rugged to resist breakage and the formation of fine particles during handling.

It has also been proposed to fuse ammonium nitrate and to disperse the fusion in the form of droplets into a cooling gas. The fused ammonium nitrate may also be mixed with finely divided calcium carbonate before the fluid mixture is dispersed into the cooling gas to solidify it. The disadvantage of such a procedure is that it entails constructing large chambers in which the sprayed fluid may travel through the cooling gas for a sufficient length of time to become solidified before striking the bottom of the chamber. It also entails the difficulties attendant upon dispersing through spray devices a fused material which tends to solidify and also the difficulties caused by the presence of solid material in the melt.

It is an object of this invention to provide a process and apparatus for the preparation of granular products comprising ammonium nitrate or urea and finely divided inert solid materials such as calcium carbonate, ground limestone, (i. e. dolomite), magnesite, phosphate rock and the like, which are substantially infusible in the melt of ammonium nitrate or urea which products are in the form of granules having a substantially uniform desired size obtained by solidifying a fluid mixture of the ammonium nitrate or urea and added material. By preparing such products in accordance with the process of this invention, they consist of substantially uniform granules, and these products may be readily and relatively inexpensively obtained. The invention is particularly of value in the preparation of fertilizers, for which it is highly desirable that the material be of granular form, relatively free from dust, and have little tendency to cake together during storage.

Ammonium nitrate and urea are suitable for treatment in accordance with this invention since when mixed with finely divided inert material they may be fused to form a fluid or plastic mass of the mixture by heating to moderate temperatures, and the fused material may be solidified by cooling through a limited temperature range, e. g. through a temperature range of about 75° C. or less, to form particles sufficiently solid and rugged to retain their shape and resist disintegration after removal from a surface on which the material is solidified. The invention is particularly applicable to the treatment of mixtures of ammonium nitrate or urea with other substances which contains a small proportion of water since the ammonium nitrate and urea have a large temperature co-efficient of solubility (i. e. their solubility in water changes greatly per degree change in temperature).

In carrying out the process of this invention a melt of a material such as referred to above, for example, a melt of ammonium nitrate or urea mixed with a finely divided inert solid material having a melting point above the melting point of the ammonium nitrate or urea and containing a small portion of water is prepared. The melt should contain a high proportion of fusible material with respect to the quantity of water present. This melt is then partially solidified in grooves formed on a cooling surface such as that of a cooling drum. The solidified material is lifted out of the grooves in which it has solidified and broken into particles of the desired size. This breaking up of the particles preferably takes place simultaneously with the removal of the solidified material from the grooves of the cooling surface. In its preferred embodiment for mixtures of ammonium nitrate or urea and calcium carbonate the process of this invention involves a partial solidification of the mixture in grooves formed upon a cooled rotating drum which dips into a fusion of the mixed materials. As the drum is rotated it picks up on its surface a layer of the ammonium nitrate-calcium carbonate melt which is wiped down to the level of the top of the ridges separating the grooves and during the further travel of the drum the material within the grooves solidifies to the desired degree and is removed from the grooves by means of a scraper element. In being lifted by the scrapers the rods of solidified material continuously formed in the grooves are broken into particles of desired length to form a granular material of substantially uniform particle size and free from fine particles. The solidification of the melt in the grooves of the cooling drum takes place to a sufficient extent so that the material during or after removal from the drum may be broken into particles which retain their shape and resist disintegration during subsequent handling. This solidification may result in a plastic or brittle material which may be removed readily from the drum surface and with or without further cooling be broken into particles of the desired size.

The apparatus of this invention comprises a rotatable drum having upon its surface circumferential grooves separated by ridges. Both the width of the bottom of the grooves and the depth of the grooves are of the order of 0.1 inch. The sides of the grooves preferably flare outward from each other towards the top, forming an angle of about 99½° with the bottom of the groove. The grooves are preferably in the form of discrete circles in planes perpendicular to the axis of the drum, but may be in the form of one or more continuous helixes on the drum surface. Grooves may also be provided in the form of concentric circles at the ends of the drum over the area which is immersed in the melt as the drum rotates. The drum of the apparatus may be shortened to have but a very narrow cylindrical surface and all of the grooves then be formed on the end surfaces of the drum which dip into the melt. Provision is made for cooling the material in the grooves, as for example by employing a hollow metal drum through which a cooling medium is passed. Means are also provided for supplying a fluid or plastic material to the grooves of the drum, and for lifting solidified material from the grooves during rotation of the drum.

The accompanying drawing illustrates one example of the apparatus of this invention. In the drawing Fig. 1 is an elevation, partly in cross-section, of an apparatus suitable for granulating fertilizers in accordance with this invention; Fig. 2 is a cross-section of the apparatus shown in Fig. 1, taken along the line II—II; Fig. 3 is an enlarged showing of a section of the surface of drum 3 of Fig. 1; and Fig. 4 illustrates a modification of the surface of drum 3 shown in Fig. 1.

The following example is illustrative of processes for the preparation of fertilizers in accordance with this invention:

*Example.*—A solution of ammonium nitrate is evaporated until it contains about 95% ammonium nitrate and 5% water. To this melt at a temperature of about 120° C. there is added powdered limestone of about 100 mesh size. The limestone at atmospheric temperatures is introduced into the ammonium nitrate melt in the proportions of about 43 parts of limestone to about 47 parts of ammonium nitrate, calculated on the basis of anhydrous ammonium nitrate. After mixing the ammonium nitrate fusion and limestone under these conditions, the mixture will have a temperature in the neighborhood of 110° C. and, at this temperature, is run into the pan of the flaking device shown in the accompanying drawing.

The flaking device shown in Figs. 1 and 2 consists of a pan 1 having a jacket 2 whereby the above mixture of ammonium nitrate-limestone may be maintained at about 110° C. A metal drum 3 dips below the surface of the fusion in pan 1. Drum 3 is hollow and is provided with an inlet 4 and an outlet 5 formed in the hollow shafts 4' and 5' to which drum 3 is fixed for rotation with the shafts. The surface of drum 3 is formed of a series of grooves 6 separated by partitions 7. These grooves and partitions may take the forms shown either in Fig. 3 or 4, the grooves of Fig. 3 being tapered toward the bottom while the grooves in Fig. 4 have parallel sides. The grooves 6 on the surface of drum 3 may have the following dimensions in inches:

|  | Fig. 3 | Fig. 4 |
|---|---|---|
| Width (at top) | 0.12 | 0.07 |
| Width (at bottom) | 0.10 | 0.07 |
| Depth | 0.06 | 0.07 |
| Width (at top) of ridges between grooves | 0.03 | 0.03 |
| Angle between sides and bottom | 99.4° | |

Above the surface of the melt in pan 1 on the side at which the surface of the drum emerges from the melt in its rotation, there is a smoother 8 which consists of a bar lying transversely across the face of drum 3 so that as the drum turns material on the drum surface lying above the partitions between the grooves is wiped off, leaving the strands or rods of material in the grooves clearly separated. The smoother 8 may be mounted so as to oscillate longitudinally and thus make any wear on its surface uniform. The apparatus also comprises a scraper 9 having teeth entering grooves 6.

In granulating the mixture of ammonium nitrate-limestone supplied to pan 1 and maintained in this pan at a temperature of 110° C., as drum 3 is rotated in the direction of the arrow in Fig. 2, the portion of the drum which is submerged in the fusion picks up a layer of the fused material on the surface of the drum and within the grooves 6. Smoother 8 scrapes off the adhering coating of material which lies above the partitions between the grooves and, as the drum rotates with cooling water being passed through its interior, the material in the grooves is cooled so that by the time it reaches scraper 9 the material in the grooves is congealed sufficiently to be picked out of the grooves by the scraper and broken into particles of desired length. Thus, for the above mixture of ammonium nitrate-limestone in which the ammonium nitrate contained 5% water, the material in the grooves is cooled to a temperature of about 75° C. by the time it reaches the point where it is lifted from the grooves by scraper 9. Under these conditions and employing a flaking device with grooves having the above dimensions, the material is broken into granules of about 6 to 10 mesh size. Grooves of a larger size may be employed, but in such a case it is usually desirable to employ a breaker mechanism to prevent the material lifted from the grooves assuming the form of long strands. This breaker mechanism may consist of a rubber-covered, freely-turning roller, about ⅜" in diameter, positioned in the angle of the drum and the scraper. The use of such a breaker mechanism is also desirable when the material in the grooves is cooled to a lower temperature than that given above by the time it reaches the scraper. The use of the apparatus and process of this invention is particularly advantageous because of the granulated product of remarkably uniform particle size which may be obtained directly from the cooling drum without necessitating a crushing or grinding of the solidified melt. For this reason the process and apparatus of this invention are especially advantageous as compared with a procedure involving a mechanical breaking up of large blocks or sheets of solid material in which a considerable proportion of the material forms fine dust-like particles which are particularly objectionable in fertilizers.

The granules are passed directly into a rotary drier and treated with heated air to dry them. It is preferred to coat the granules with finely divided limestone. This coating of the granules may be accomplished by drying them until they contain about 0.4% moisture. The thus partially dried granules are then introduced into a rotating drum together with about half their weight of finely powdered limestone. The mixture of granules and limestone is tumbled in the drum at a temperature of about 100° C. to give the granules a coating of limestone. The mixture of granules and excess limestone next passes to a second rotary drier where, by means of heated air, the moisture content is reduced to about 0.1%. The granules are separated from the excess limestone by screening, and the fines may be returned for mixture with ammonium nitrate in preparing additional material for granulation. Under the specified conditions, it has been found that every 90 parts of granules prior to tumbling with the finely divided limestone to receive the coating thereon retain about 10 parts by weight of the limestone with which the granules are tumbled. This limestone forms a substantially uniform adherent coating on the surfaces of the granules.

The foregoing procedure may be modified, if desired, by drying the granulated mixture as it comes from the flaking drum until it contains about 0.1% moisture and spraying the dried granules in a rotary mixer with about 0.5% of an atomized oil such as petrolatum heated to a temperature at which it is fluid. The oil employed may be one having a viscosity ranging from that of heavy gear oil to that of petrolatum. The granules treated with oil are then mixed with ground limestone and, after tumbling the mixture for a short period of time, the granules are coated with limestone. The use of oil in this process results in a product characterized by a relatively slow absorption of moisture during storage as compared with a product prepared without the oil treatment.

If desired, the coating step in the process described may be omitted and the granules from the cooling drum may be directly dried to a content of about 0.1% moisture to obtain a satisfactory fertilizer product. The coating of the granules with finely divided limestone, however, improves the storage properties of the granules. This is believed due to the tendency of the ammonium nitrate to migrate to the surface of the granules during their drying treatment. By applying the coating to the granules the tendency of any surface layer of ammonium nitrate to cause the caking of the granules during storage is repressed.

Urea or mixtures of urea and limestone may be granulated by the process described, by maintaining the material in the pan of the apparatus at a temperature at which it has the proper fluidity to be picked up on the rotating drum and so cooling the material on the drum that it has solidified sufficiently by the time it reaches the scraper for it to be removed from the grooves on the drum.

The foregoing example is illustrative of the invention without defining its limits. In general, in granulating melts in accordance with the process described, the slurry or melt in the pan of the granulating device is maintained in a sufficiently fluid state so that it fills the grooves of the drum and yet is at a temperature at which the slurry is partially congealed on the submerged portion of the drum so that the material is retained in the grooves as it leaves the pan. The material on the drum by the time it reaches the scraper which removes it from the grooves, is cooled to a temperature at which it has the proper plasticity for being lifted out of the grooves and being broken into the desired length and yet is sufficiently solidified so that the granules will withstand the subsequent drying or coating treatment without coalescing or disintegrating.

A further general factor covering the conditions of operation of the process is the tendency of the materials to decompose. In general, the following temperatures should not be exceeded in any of the steps of the process for the indicated materials:

|  | Degrees centigrade |
|---|---|
| Ammonium nitrate-calcium carbonate mixtures | 120 |
| Urea-calcium carbonate mixtures containing moisture | 125 |

The preferred conditions employed in preparing granulated fertilizers in accordance with the process of this invention are in general as follows:

Mixtures containing from 20% to 100% ammonium nitrate, preferably 40% to 60% ammonium nitrate, the remainder calcium carbonate. This percentage is given on a dry basis and does not include the small proportion of water which is present in the mixture. The water content may correspond to that in mixtures prepared from ammonium nitrate containing 4% to 7% water. Suitable temperatures for maintaining the material in the flaking pan and to which the material is cooled on the drum by the time it reaches the scraper, are both dependent upon the moisture content. In general, the temperatures in the pan for the above mixtures containing a small proportion of water range from about 95° C. to about 120° C. and, at the point of removal by the scraper, from about 40° C. to 90° C. For the preferred mixtures prepared from ammonium nitrate containing 4% to 7% water and calcium carbonate in the proportions to give a mixture (dry basis) containing 40% to 60% ammonium nitrate, the mixture may be maintained at about 110° C. to 115° C. in the flaker pan and cooled on the drum to about 75° to 80° C. at the point of removal by the scraper.

Melts containing from 95% to 100% ammonium nitrate (preferably about 97½% ammonium nitrate) may be granulated in the manner described. The temperature of the melt in the flaker pan for the above compositions ranges from 115° C. to 170° C. and is preferably about 145° C. for a 97½% ammonium nitrate. The temperature to which the material on the drum is cooled at the time at which it is removed from the scraper may range from 75° C. to 165° C. and is preferably about 100° C. for the 97½% ammonium nitrate.

We claim:

1. The process of preparing a granulated fertilizer which comprises preparing a fluid melt of ammonium nitrate, water and a substantial proportion of a finely divided solid material which is substantially infusible in the melt, the water being present in an amount within the range of about 4 to 7 parts of water for every 100 parts of total water and ammonium nitrate in the melt, distributing said fluid melt as strands or rods in grooves formed on a cooling surface, cooling the melt in the grooves to a temperature within the range of about 40° C. to about 90° C. which is so correlated with the water content of the melt that at the temperature to which it is cooled in the grooves the melt partially solidifies sufficiently for the strands or rods to be removed from the supporting surfaces of the grooves and to be broken into granules which retain the shape imparted thereto by the grooves, and breaking the thus solidified melt out of the grooves and into granules.

2. The process of preparing a granulated fertilizer which comprises preparing a mixture of ammonium nitrate, water and finely divided limestone in the proportions of at least 20 parts of ammonium nitrate for every 100 parts of total ammonium nitrate and limestone and about 4 to 7 parts of water for every 100 parts of total water and ammonium nitrate in the mixture, distributing said mixture as a fluid melt at a temperature within the range of about 90° C. to about 120° C. as strands or rods in grooves formed on a cooling surface, cooling the melt in the grooves to a temperature within the range of about 40° C. to about 90° C. which is so correlated with the water content of the melt that at the temperature to which it is cooled in the grooves the melt partially solidifies sufficiently for the strands or rods to be removed from the supporting surfaces of the grooves and to be broken into granules which retain the shape imparted thereto by the grooves, and breaking the thus solidified melt out of the grooves and into granules.

3. The process of preparing a granulated fertilizer which comprises preparing a fluid melt of ammonium nitrate, water and finely divided limestone in the proportions of 40 to 60 parts of ammonium nitrate for every 100 parts of total ammonium nitrate and limestone and about 4 to 7 parts of water for every 100 parts of total water and ammonium nitrate in the melt, distributing said fluid melt at about 110° C. to about 115° C. as strands or rods in grooves formed on a cooling surface, cooling the melt in the grooves to a temperature within the range of about 75° C. to about 80° C., and breaking out of the grooves and into granules the strands or rods of melt which has been partially solidified by cooling it to said temperature.

4. The process of preparing a granulated fertilizer which comprises preparing a fluid melt of ammonium nitrate, water and a substantial proportion of a finely divided solid material which is substantially infusible in the melt, the water being present in an amount within the range of about 4 to 7 parts of water for every 100 parts of total water and ammonium nitrate in the melt, distributing said fluid melt as strands or rods in grooves formed on a cooling surface, said grooves having a width and a depth of the order of 0.1 inch, cooling the melt in the grooves to a temperature within the range of about 40° C. to about 90° C. which is so correlated with the water content of the melt that at the temperature to which it is cooled in the grooves the melt partially solidifies sufficiently for the strands or rods to be removed from the supporting surfaces of the grooves and to be broken into granules which retain the shape imparted thereto by the grooves, and breaking the thus solidified melt out of the grooves and into granules.

5. The process of preparing a granulated fertilizer which comprises preparing a fluid melt of ammonium nitrate, water and finely divided limestone in the proportions of 40 to 60 parts of ammonium nitrate for every 100 parts of total ammonium nitrate and limestone and about 4 to 7 parts of water for every 100 parts of total water and ammonium nitrate in the melt, distributing said fluid melt at about 110° C. to about 115° C. as strands or rods in grooves formed on a cooling surface, said grooves having a width and a depth of the order of 0.1 inch and side walls flaring at an angle of about 99½° with the bottom of the grooves, cooling the melt in the grooves to a temperature within the range of about 75° C. to about 80° C., and breaking out of the grooves and into granules the strands or rods of melt which has been partially solidified by cooling it to said temperature.

CHARLES K. LAWRENCE.
AYLMER H. MAUDE.

---

CERTIFICATE OF CORRECTION.

Patent No. 2,118,438.   May 24, 1938.

CHARLES K. LAWRENCE, ET AL.

It is hereby certified that error appears in the printed specification of the above numbered patent requiring correction as follows: Page 3, second column, lines 20, 22, 31-32 and 48, for the words "calcium carbonate" read limestone; and that the said Letters Patent should be read with these corrections therein that the same may conform to the record of the case in the Patent Office.

Signed and sealed this 12th day of July, A. D. 1938.

(Seal)

Henry Van Arsdale,
Acting Commissioner of Patents.

grooves formed on a cooling surface, cooling the melt in the grooves to a temperature within the range of about 40° C. to about 90° C. which is so correlated with the water content of the melt that at the temperature to which it is cooled in the grooves the melt partially solidifies sufficiently for the strands or rods to be removed from the supporting surfaces of the grooves and to be broken into granules which retain the shape imparted thereto by the grooves, and breaking the thus solidified melt out of the grooves and into granules.

2. The process of preparing a granulated fertilizer which comprises preparing a mixture of ammonium nitrate, water and finely divided limestone in the proportions of at least 20 parts of ammonium nitrate for every 100 parts of total ammonium nitrate and limestone and about 4 to 7 parts of water for every 100 parts of total water and ammonium nitrate in the mixture, distributing said mixture as a fluid melt at a temperature within the range of about 90° C. to about 120° C. as strands or rods in grooves formed on a cooling surface, cooling the melt in the grooves to a temperature within the range of about 40° C. to about 90° C. which is so correlated with the water content of the melt that at the temperature to which it is cooled in the grooves the melt partially solidifies sufficiently for the strands or rods to be removed from the supporting surfaces of the grooves and to be broken into granules which retain the shape imparted thereto by the grooves, and breaking the thus solidified melt out of the grooves and into granules.

3. The process of preparing a granulated fertilizer which comprises preparing a fluid melt of ammonium nitrate, water and finely divided limestone in the proportions of 40 to 60 parts of ammonium nitrate for every 100 parts of total ammonium nitrate and limestone and about 4 to 7 parts of water for every 100 parts of total water and ammonium nitrate in the melt, distributing said fluid melt at about 110° C. to about 115° C. as strands or rods in grooves formed on a cooling surface, cooling the melt in the grooves to a temperature within the range of about 75° C. to about 80° C., and breaking out of the grooves and into granules the strands or rods of melt which has been partially solidified by cooling it to said temperature.

4. The process of preparing a granulated fertilizer which comprises preparing a fluid melt of ammonium nitrate, water and a substantial proportion of a finely divided solid material which is substantially infusible in the melt, the water being present in an amount within the range of about 4 to 7 parts of water for every 100 parts of total water and ammonium nitrate in the melt, distributing said fluid melt as strands or rods in grooves formed on a cooling surface, said grooves having a width and a depth of the order of 0.1 inch, cooling the melt in the grooves to a temperature within the range of about 40° C. to about 90° C. which is so correlated with the water content of the melt that at the temperature to which it is cooled in the grooves the melt partially solidifies sufficiently for the strands or rods to be removed from the supporting surfaces of the grooves and to be broken into granules which retain the shape imparted thereto by the grooves, and breaking the thus solidified melt out of the grooves and into granules.

5. The process of preparing a granulated fertilizer which comprises preparing a fluid melt of ammonium nitrate, water and finely divided limestone in the proportions of 40 to 60 parts of ammonium nitrate for every 100 parts of total ammonium nitrate and limestone and about 4 to 7 parts of water for every 100 parts of total water and ammonium nitrate in the melt, distributing said fluid melt at about 110° C. to about 115° C. as strands or rods in grooves formed on a cooling surface, said grooves having a width and a depth of the order of 0.1 inch and side walls flaring at an angle of about 99½° with the bottom of the grooves, cooling the melt in the grooves to a temperature within the range of about 75° C. to about 80° C., and breaking out of the grooves and into granules the strands or rods of melt which has been partially solidified by cooling it to said temperature.

CHARLES K. LAWRENCE.
AYLMER H. MAUDE.

CERTIFICATE OF CORRECTION.

Patent No. 2,118,438. May 24, 1938.

CHARLES K. LAWRENCE, ET AL.

It is hereby certified that error appears in the printed specification of the above numbered patent requiring correction as follows: Page 3, second column, lines 20, 22, 31-32 and 48, for the words "calcium carbonate" read limestone; and that the said Letters Patent should be read with these corrections therein that the same may conform to the record of the case in the Patent Office.

Signed and sealed this 12th day of July, A. D. 1938.

(Seal)

Henry Van Arsdale,
Acting Commissioner of Patents.

CERTIFICATE OF CORRECTION.

Patent No. 2,118,438. May 24, 1938.

CHARLES K. LAWRENCE, ET AL.

It is hereby certified that error appears in the printed specification of the above numbered patent requiring correction as follows: Page 3, second column, lines 20, 22, 31-32 and 48, for the words "calcium carbonate" read limestone; and that the said Letters Patent should be read with these corrections therein that the same may conform to the record of the case in the Patent Office.

Signed and sealed this 12th day of July, A. D. 1938.

(Seal)

Henry Van Arsdale,
Acting Commissioner of Patents.